(12) United States Patent
Seevers et al.

(10) Patent No.: US 8,029,632 B2
(45) Date of Patent: Oct. 4, 2011

(54) METHOD FOR PRODUCING A BELT PACKAGE FOR A PNEUMATIC VEHICLE TIRE

(75) Inventors: Jörn Seevers, Burgdorf (DE); Ewald Kneussel, Barsinghausen (DE); Oliver Kirschning, Hannover (DE)

(73) Assignee: Continental AG, Hanover (DE)

( * ) Notice: Subject to any disclaimer, the term of this patent is extended or adjusted under 35 U.S.C. 154(b) by 696 days.

(21) Appl. No.: 12/106,443

(22) Filed: Apr. 21, 2008

(65) Prior Publication Data

US 2008/0196811 A1 Aug. 21, 2008

Related U.S. Application Data

(63) Continuation of application No. PCT/EP2006/067121, filed on Oct. 6, 2006.

(30) Foreign Application Priority Data

Nov. 16, 2005 (DE) .......................... 10 2005 054 507

(51) Int. Cl.
*B29D 30/70* (2006.01)

(52) U.S. Cl. ...... 156/126; 156/130; 156/133; 156/406.2

(58) Field of Classification Search .................. 156/123, 156/124, 126, 127, 130, 133, 406.2, 417, 156/421.8; 152/532

See application file for complete search history.

(56) References Cited

U.S. PATENT DOCUMENTS

| | | | |
|---|---|---|---|
| 1,785,659 A * | 12/1930 | State | ............................ 156/126 |
| 3,151,013 A | 9/1964 | Nebout | |
| 4,178,198 A * | 12/1979 | Kent | ................................ 156/96 |
| 4,268,330 A * | 5/1981 | Komatsu et al. | ............... 156/111 |
| 4,738,738 A * | 4/1988 | Holroyd et al. | ................ 156/129 |
| 4,846,907 A | 7/1989 | Kumagai et al. | |
| 6,645,334 B1 * | 11/2003 | Smith et al. | ..................... 156/124 |
| 6,969,439 B1 | 11/2005 | Takagi | |
| 2001/0008158 A1 | 7/2001 | Kojima et al. | |
| 2004/0261934 A1 * | 12/2004 | Nakata et al. | .................. 156/126 |
| 2007/0034318 A1 * | 2/2007 | Hanada et al. | ................. 156/126 |

FOREIGN PATENT DOCUMENTS

| | | |
|---|---|---|
| DE | 40 21 672 A1 | 1/1992 |
| DE | 41 08 260 A1 | 9/1992 |
| DE | 199 18 523 C1 | 4/2000 |
| EP | 0 465 828 A2 | 1/1992 |
| EP | 0 503 532 B1 | 9/1992 |
| EP | 0 537 780 A2 | 4/1993 |
| EP | 1 226 925 A1 | 7/2002 |
| JP | 11-309790 A | 11/1999 |
| WO | 00/46018 A1 | 8/2000 |
| WO | WO-2005/051641 A1 * | 6/2005 |
| WO | 2005/095092 A1 | 10/2005 |

OTHER PUBLICATIONS

International Search Report, dated Dec. 19, 2006.

* cited by examiner

*Primary Examiner* — Geoffrey L Knable

(74) *Attorney, Agent, or Firm* — Laurence A. Greenberg; Werner H. Stemer; Ralph E. Locher

(57) ABSTRACT

A belt package for a pneumatic vehicle tire has at least two belt plies. The belt plies are built up in at least two sub-packages, which are automatically placed on a belt drum and automatically spliced independently of one another. The sub-packages are then joined together to form the complete belt package.

8 Claims, 3 Drawing Sheets

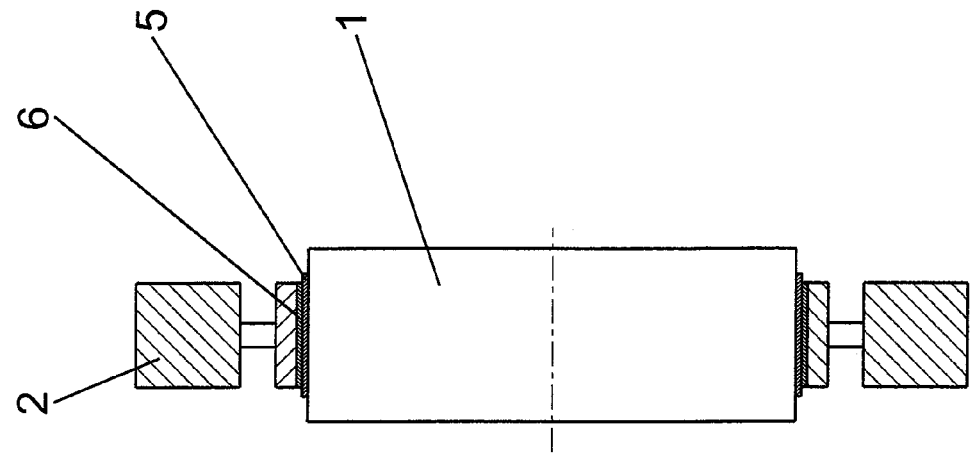
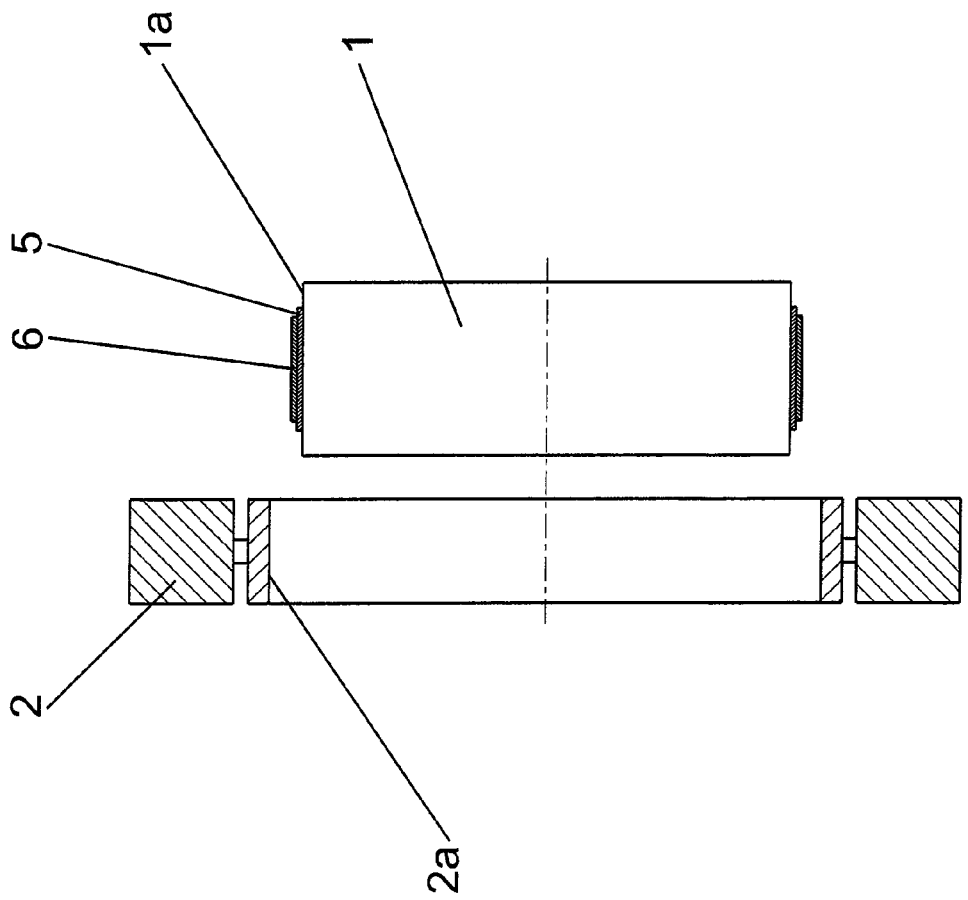

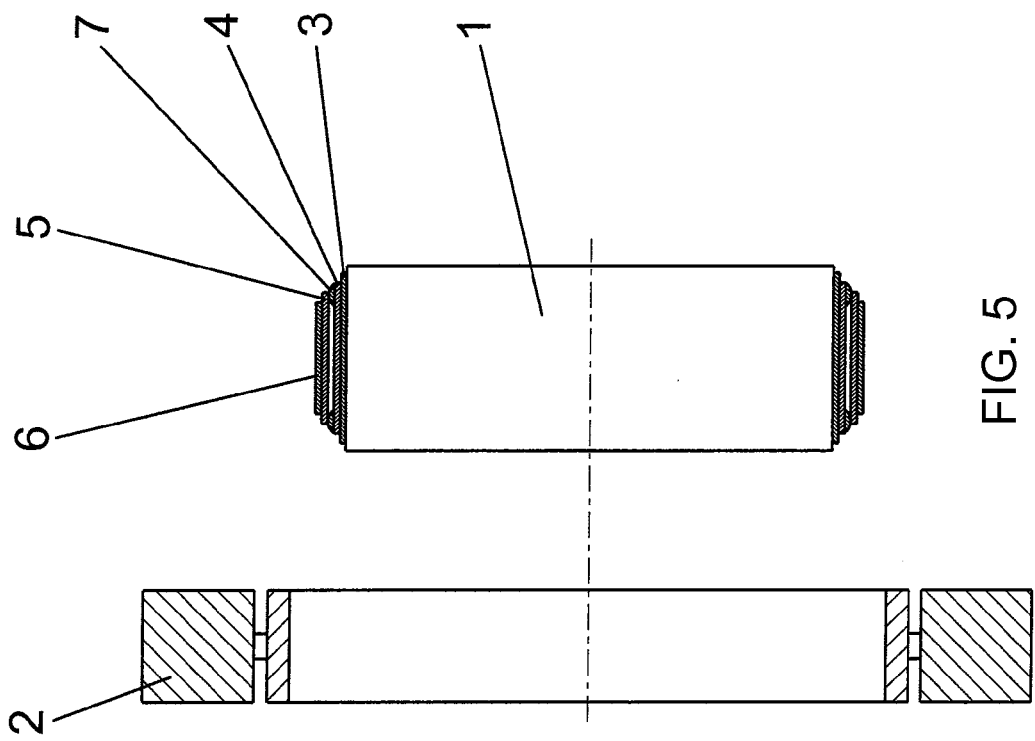
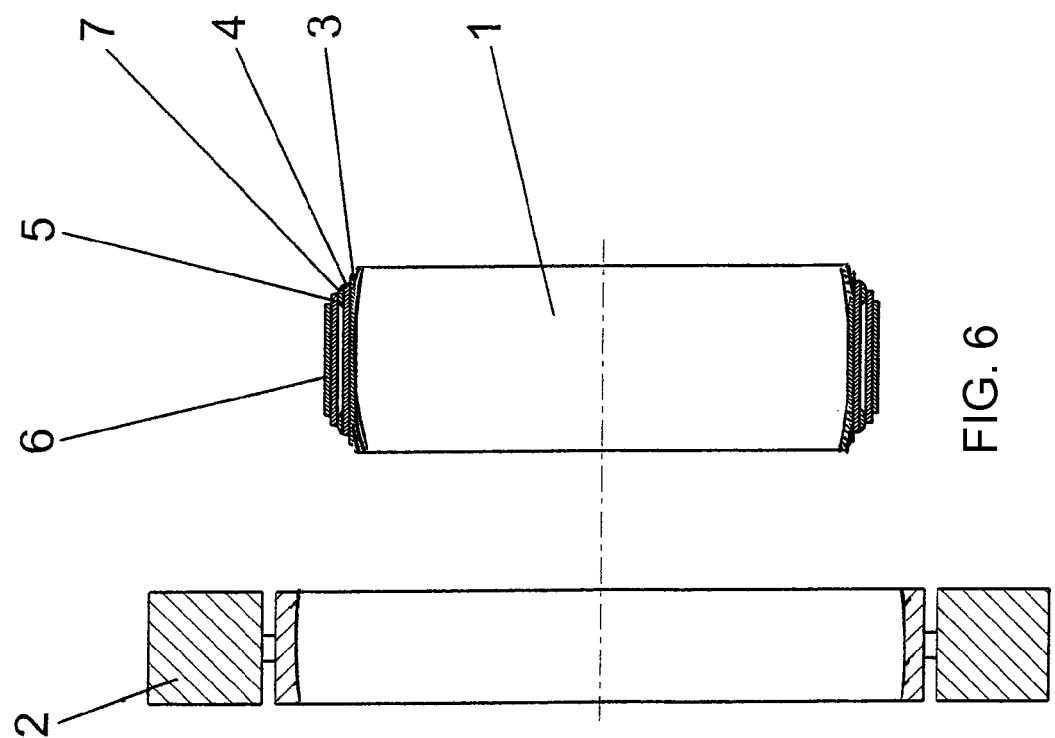

METHOD FOR PRODUCING A BELT PACKAGE FOR A PNEUMATIC VEHICLE TIRE

CROSS-REFERENCE TO RELATED APPLICATIONS

This is a continuation, under 35 U.S.C. §120, of copending international application No. PCT/EP2006/067121, filed Oct. 6, 2006, which designated the United States; this application also claims the priority, under 35 U.S.C. §119, of German patent application No. DE 10 2005 054 507.6, filed Nov. 16, 2005; the prior applications are herewith incorporated by reference in their entirety.

BACKGROUND OF THE INVENTION

Field of the Invention

The invention relates to a method of producing a belt package for pneumatic vehicle tires comprising at least two belt plies. The invention also relates to certain device components to be used in the method, and to a vehicle tire produced by the method.

Commonly assigned German published patent application DE 41 08 260 A1 and its corresponding European patent EP 0 503 532 B1 describe a method for producing tread/belt packages for pneumatic vehicle tires that allows a large number of tread/belt packages to be produced in as short a time as possible. In this case, at least two plies of a belt are placed on a first of two belt drums which are arranged on coaxial shafts and can be driven independently of each other, the plies being drawn off from a belt ply feeder. The entire belt ply package is transferred by means of a transfer device to the second belt drum, on which a winding bandage is created by coiling and a tread is placed on. In the meantime, the belt plies for a further belt package are applied essentially simultaneously on the first belt drum. The finished tread/belt package is removed by means of a transfer device of the second belt drum.

Commonly assigned German published patent application DE 40 21 672 A proposes, for the purposed of automating tire production, to wind up the individual plies of a belt on a first belt drum, a second belt drum being provided, and the second and first belt drums being configured in such a way that one can be brought axially inside the other. This allows the segments of the second belt drum to take up the package of plies, the two belt drums subsequently being removed from each other and it being possible for a further package of plies to be produced on the first belt drum. On the second belt drum, the first package of plies is then also provided if necessary with a winding bandage and subsequently completed with the tread to form a complete tread/belt package.

In the successive placement of the individual plies of multiply belts, it is repeatedly found that the supporting surface of an applied belt ply is no longer cylindrical but distinctly contoured or uneven. This may be attributable to the fact that the materials placed one on top of the other for the belt plies have different thicknesses and widths or that further components, such as for instance cover strips or belt edge pads, are occasionally applied at the edges of the belt. With each web of material that is placed on and each component that is placed on, the supporting surface becomes more irregular. The contoured supporting surface produced in this way does not allow the subsequent web of material to be automatically placed on and automatically spliced with the devices that are currently available.

SUMMARY OF THE INVENTION

It is accordingly an object of the invention to provide a method of producing a belt package for a vehicle tire which overcomes the above-mentioned disadvantages of the heretofore-known devices and methods of this general type and which provides for a method by which the automatic placement and the automatic splicing of all the belt plies of a belt package is possible, even if additional components, such as belt edge pads, are to be applied and a contoured outer contour of the already applied belt ply or plies is obtained during the buildup of the belt.

With the foregoing and other objects in view there is provided, in accordance with the invention, a method of producing a belt package for a pneumatic vehicle tire with at least two belt plies, the method which comprises:

automatically placing belt plies on a belt drum and automatically splicing the belt plies to build up at least two sub-packages of belt plies independently of one another; and joining the sub-packages of belt plies together to form a complete belt package.

In other words, the objects of the invention are achieved in that the belt plies are built up in at least two sub-packages, which are automatically placed on a belt drum and automatically spliced independently of one another, the sub-packages being joined together to form the complete belt package.

The method according to the invention allows all the belt plies to be automatically placed and automatically spliced. The sub-packages are created in such a way that, in particular if ever a web of material were to become too uneven, to permit automatic placement and automatic splicing of the next-following belt ply, the remaining belt ply or the remaining belt plies is/are built up separately in at least one additional sub-package, the sub-packages subsequently being joined to one another.

With the method according to the invention, complete belt packages can be built up and created in a very flexible way. For example, one belt ply may be created in each sub-package, or two or more belt plies may be contained in a sub-package. Usually, belt edge pads, edge strips or similar components are applied to at least one of the sub-packages as outermost components. Precisely these components would provide a very contoured, uneven supporting surface for the following belt ply. According to the invention, direct placement of the next-following belt ply is no longer necessary.

The method according to the invention can, furthermore, be carried out in a very efficient way. In this connection, it is of advantage if at least one of the sub-packages is transferred from the belt drum to a belt carrying ring and remains positioned on this until it is joined together with another sub-package. In this case, the sub-package built up on a belt drum can be joined together with a sub-package held on a belt carrying ring. A further advantage of the method is that the required number of belt carrying rings and belt drums can be used.

Before joining together two sub-packages, one of which is on a belt carrying ring and the second of which is on a belt drum, all that is necessary is to position the belt carrying ring over the belt drum. Joining together of the two sub-packages can be subsequently carried out in a very easy way. The alternatives available here comprise joining together by reducing the inside diameter of the belt carrying ring, joining together by increasing the outside diameter of the belt drum and a combination of these two measures at the same time.

The invention also relates to a belt drum for use in the method according to the invention that is wherein its supporting surface is slightly concavely curved. On such a belt drum, the belt plies can be created in an already somewhat pre-contoured form.

A belt drum configured in such a way is used with preference with a belt carrying ring on which the inner surface is slightly convexly curved.

The invention also relates to a pneumatic vehicle tire produced by the method according to the invention. A tire produced in this way is of particularly high quality, since it can have a high degree of uniformity.

Other features which are considered as characteristic for the invention are set forth in the appended claims.

Although the invention is illustrated and described herein as embodied in method for producing a belt package for a pneumatic vehicle tire, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWINGS

FIG. 1 is a diagrammatic view of a belt drum and a belt carrier ring illustrating a first step of the method according to the invention;

FIGS. 2-5 illustrate various individual steps in the buildup of a four-ply belt of a pneumatic vehicle tire using the belt drum and the belt carrying ring; and FIG. 6 shows an alternative embodiment in which the belt carrier ring has a slightly convex inner surface and the belt drum has a slightly concave surface.

DETAILED DESCRIPTION OF THE INVENTION

Figure 3:
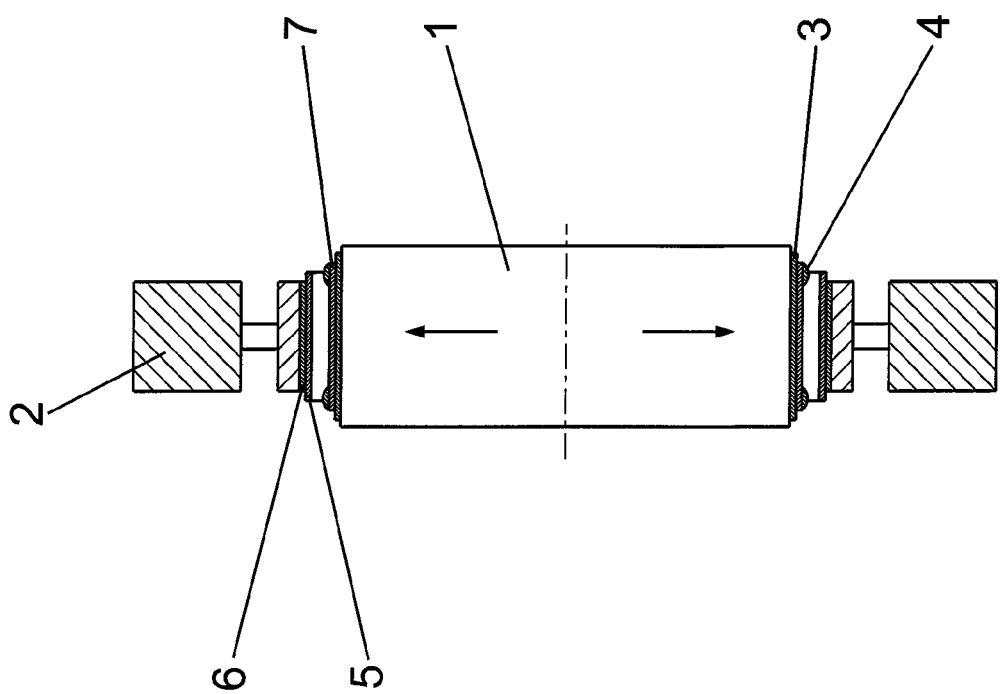

Referring now to the figures of the drawing in detail, the apparatus used in the invention comprises a belt drum 1 with a cylindrical supporting surface and a belt carrying ring 2 with a cylindrical inner surface 2a, the lateral surface of a cylinder respectively being meant. At least one of the two components, but preferably both, is or are segmented in the known way and expandable and retractable in the radial direction. The method according to the invention is described in more detail on the basis of the buildup of a belt package comprising four belt plies 3, 4, 5, 6 and having two belt edge pads 7 between the second and third belt plies 4, 5. A belt package built up in such a way is used, for example, in the pneumatic vehicle tires for heavy trucks. The radially innermost belt ply 3 is referred to as the first belt ply, and the radially outermost belt ply 6 is referred to as the fourth belt ply. The belt plies 3, 4, 5, 6 are produced in a known way from cut-to-length webs of steel cords embedded in a rubber compound.

Figure 4:
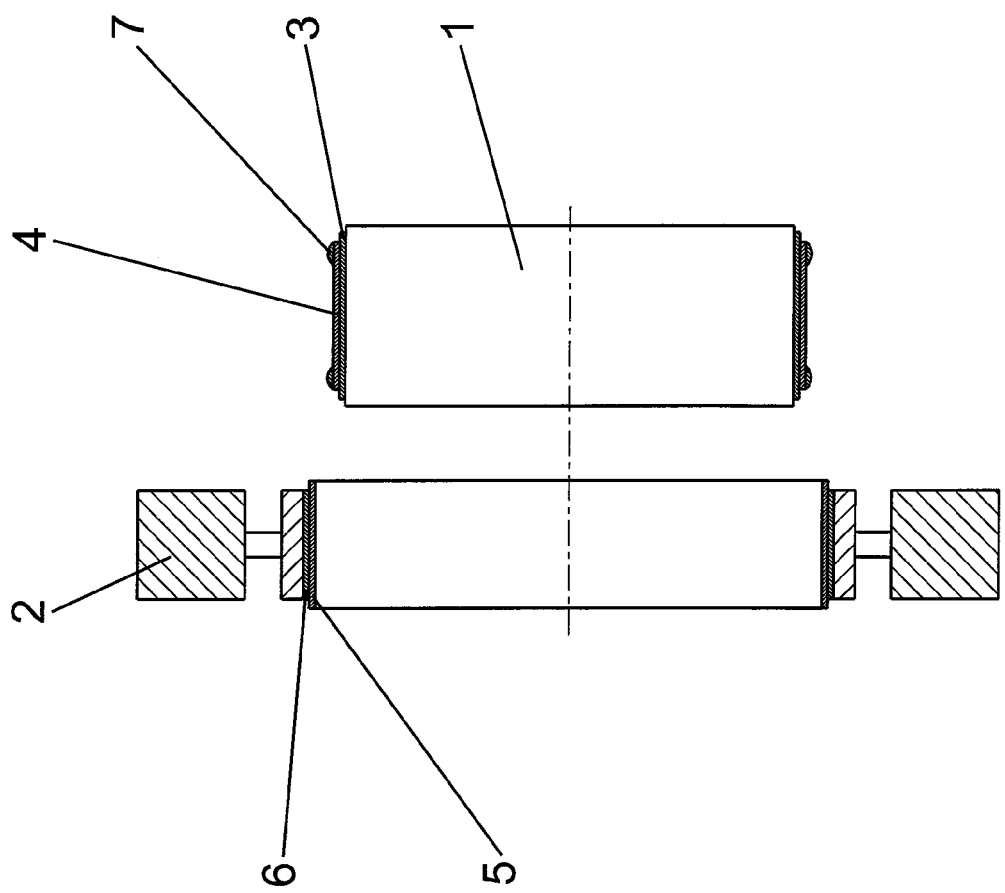

To build up the four-ply belt package, the third belt ply 5 and subsequently the fourth belt ply 6 are automatically placed onto the cylindrical belt drum 1 and automatically spliced. Referring, first, to FIG. 1, there is shown the finished sub-package comprising the belt plies 5 and 6 on the belt drum 1. The belt carrying ring 2 is then moved over the belt drum 1 and retracted in the radial direction to reduce its inside diameter. By means of clamping devices that are not represented, the belt carrying ring 2 takes over the sub-package comprising the third and fourth belt plies 5, 6. FIG. 2 shows the belt drum 1 and the belt carrying ring 2 just before the takeover of the sub-package at the two belt plies 5, 6. While the two belt plies 5, 6 remain positioned on the belt carrying ring 2, the first belt ply 3 and subsequently the second belt ply 4 are automatically placed on the cylindrical belt drum 1 and automatically spliced. Then, the two belt edge pads 7, profiles made of a rubber compound, are placed on at the side edges of the belt ply 4. FIG. 3 shows this stage of the buildup of the sub-package comprising the belt plies 3, 4 and the pads 7. Then, the belt carrying ring 2 is positioned over the belt drum 1, as represented in FIG. 4. By radial expansion of the segments of the belt drum 1, the components on the belt drum 1—the first and second belt plies 3, 4 and the two belt edge pads 7—are joined to the third and fourth belt plies 5, 6 on the belt carrying ring 2. Then, the clamping of the belt plies 5, 6 is released and the belt carrying ring 2 is moved into a position to the side of the belt drum 1, as FIG. 5 shows. The finished belt package is then on the belt drum 1. The buildup of the green tire with a belt package produced in such a manner can be carried out in a known way. In particular, the finished belt package is provided with a tread, transferred to a transfer device and transferred by the latter to an already built up tire carcass and positioned on the tire carcass.

In the case of belt packages built up by the method according to the invention, the need for a belt ply to be applied directly to a substructure having a contoured supporting surface is avoided. This would be the case for instance if the third belt ply 5 were applied directly to the second belt ply 4, provided with the two belt edge pads 7. In this case, it would no longer be possible to place the third and fourth belt plies on automatically and splice them automatically.

In the case of the embodiment represented here, the sub-package comprising the first and second belt plies 3, 4 and the two belt edge pads 7 is increased in diameter, in order to be joined to the second sub-package comprising the third and fourth belt plies 5, 6. As an alternative to this, it may also be envisaged to reduce the sub-package comprising the third and fourth belt plies 5, 6 in diameter to establish the join with the belt sub-package comprising the first and second belt plies 3, 4 and the two belt edge pads 7. The reduction in diameter is effected by means of the belt carrying ring 2. In the case of a further possible alternative, the two sub-packages may be joined together by increasing the diameter of the belt drum 1 and at the same time reducing the diameter of the belt carrying ring 2.

A number of belt carrying rings and a number of belt drums may be used. As a result, the buildup of the belt package can be performed in a largely flexible manner. For instance, in the case of a further configurational variant that is not separately shown, it is possible for the spliced third belt ply 5 to be transferred from the belt drum onto a belt carrying ring and the fourth belt ply 6 to be automatically placed on its own on the belt drum and spliced. Joining together of the two belt plies 5, 6 can be performed in a way analogous to the method steps shown in FIGS. 3 to 5. Equally, the sub-package may be created from the first and second belt plies with the two belt edge pads 7 subsequently placed on. It may in this case be envisaged to place belt edge strips on additionally in the case of one or more of the belt plies 3, 4, 5 and 6.

As described, the belt drum or the belt drums can provide a cylindrical supporting surface. As an alternative to this, it is possible to provide a supporting surface that is slightly convexly contoured in cross section on the belt drum or the belt drums. In an analogous way, the segments of the belt carrying ring or rings may also be contoured, here by means of a curvature that is slightly concave in cross section. The concave surface of the ring 2 and the convex peripheral surface of the drum 1 are illustrated in FIG. 6.

The invention claimed is:

1. A method of producing a belt package for a pneumatic vehicle tire with at least two belt plies, the method which comprises:
    automatically placing belt plies on a belt drum and automatically splicing the belt plies to build up at least two sub-packages of belt plies independently of one another, each sub-package including at least one belt ply; and
    positioning a belt carrying ring over the belt drum;
    reducing an inside diameter of the belt carrying ring by retracting the belt carrying ring in a radial direction for taking over and retaining a first one of the at least two sub-packages of belt plies;
    joining the sub-packages of belt plies together to form a complete belt package; and
    positioning the belt carrying ring with the taken over first sub-package over the belt drum prior to joining the sub-packages.

2. The method according to claim 1, which comprises applying belt edge pads or edge strips to at least one of the sub-packages as outermost components.

3. The method according to claim 1, which comprises retaining the first sub-package positioned on the belt carrying ring until the at least one sub-package is joined together with another sub-package.

4. The method according to claim 1, wherein the joining step comprises reducing an inner diameter of the belt carrying ring.

5. The method according to claim 1, wherein the joining step comprises increasing an outer diameter of the belt drum.

6. The method according to claim 1, wherein the joining step comprises reducing an inner diameter of the belt carrying ring and at the same time increasing an outer diameter of the belt drum.

7. The method according to claim 1, which comprises providing a supporting surface formed on the belt drum that is slightly convexly curved.

8. The method according to claim 1, which comprises providing an inner surface of the belt carrying ring that is slightly concavely curved.

* * * * *